Jan. 19, 1932. D. C. DRAPER 1,841,467
BEAN PILING APPARATUS
Filed Dec. 17, 1930 4 Sheets-Sheet 1
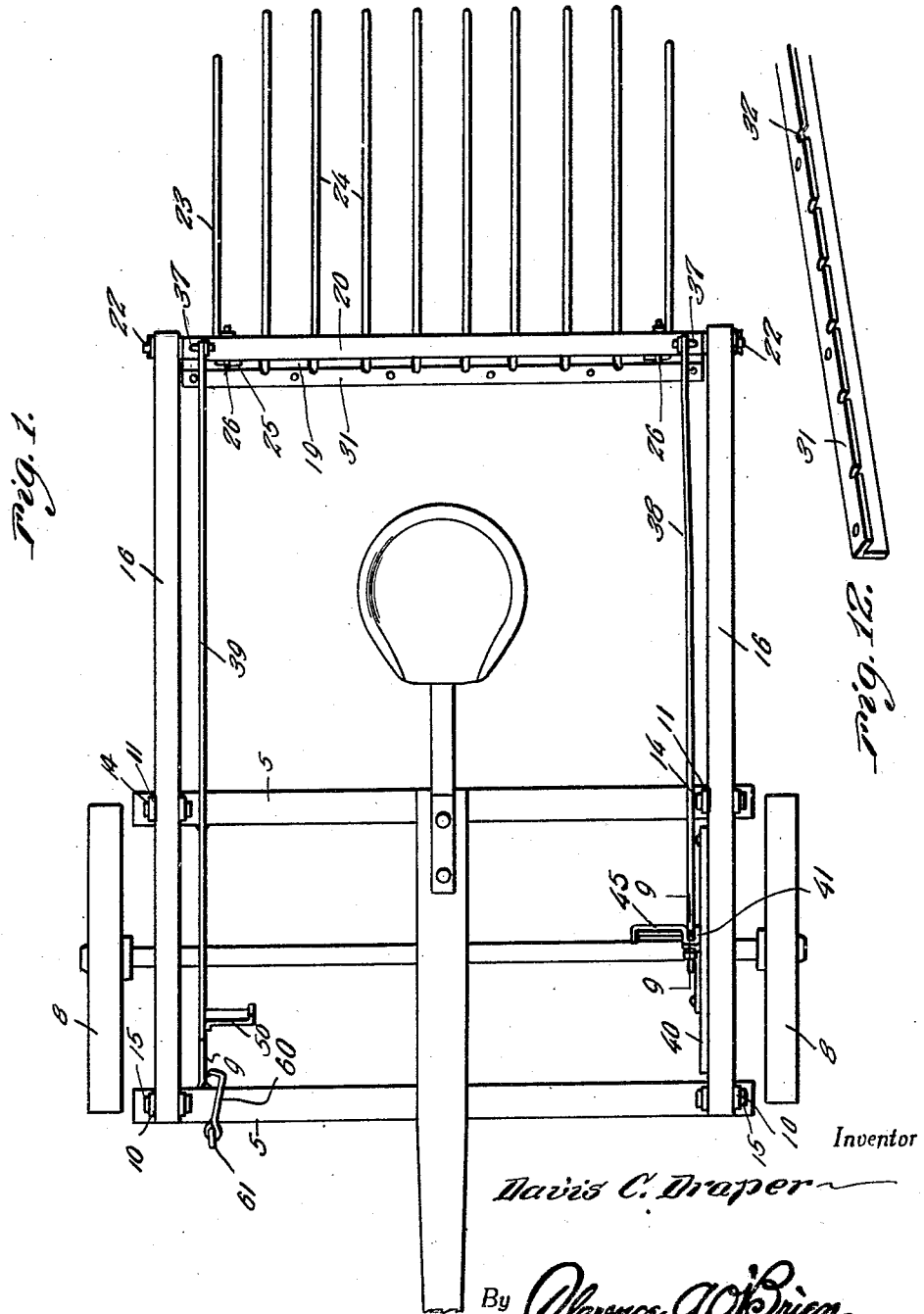
Inventor
Davis C. Draper
By Clarence A. O'Brien
Attorney

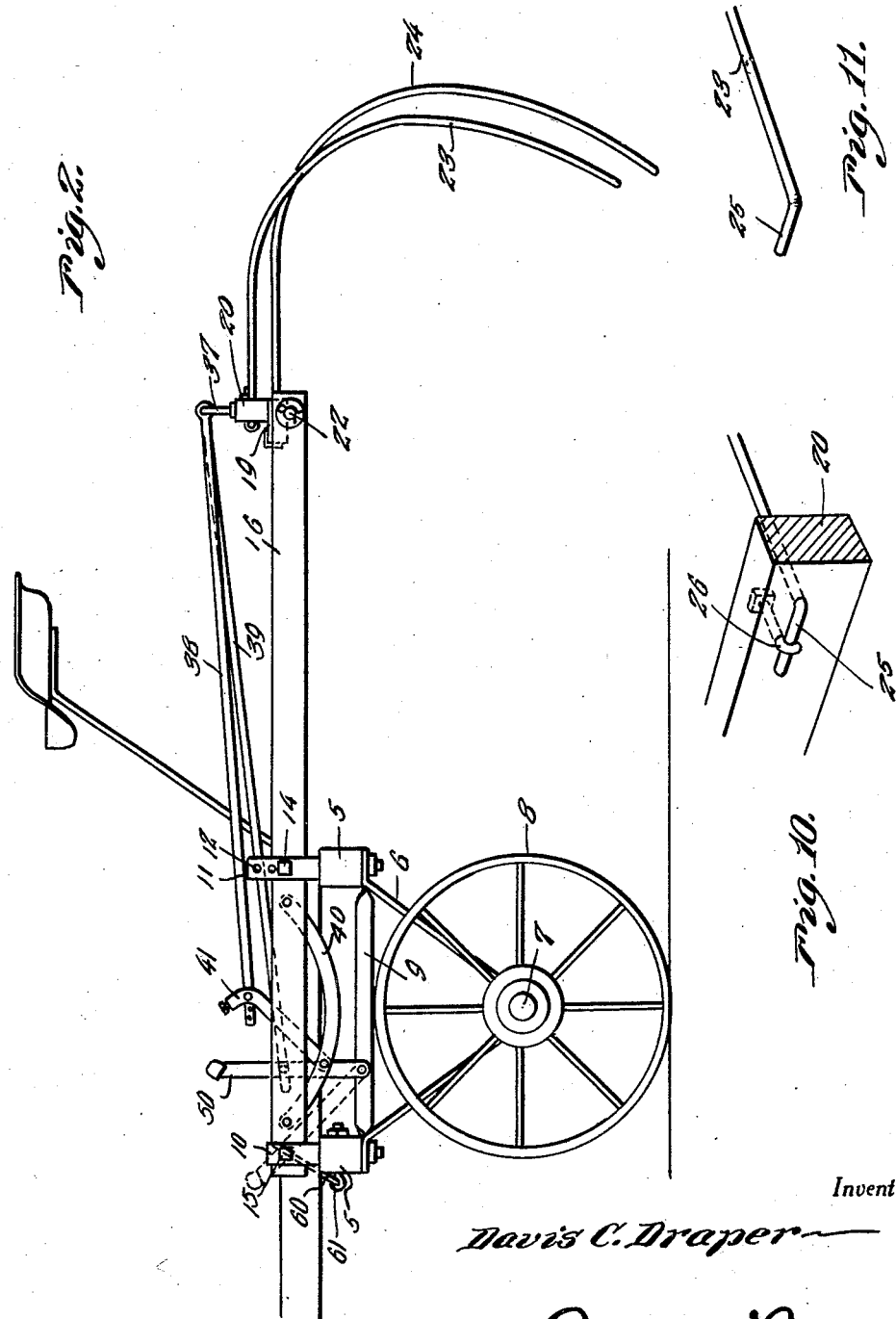

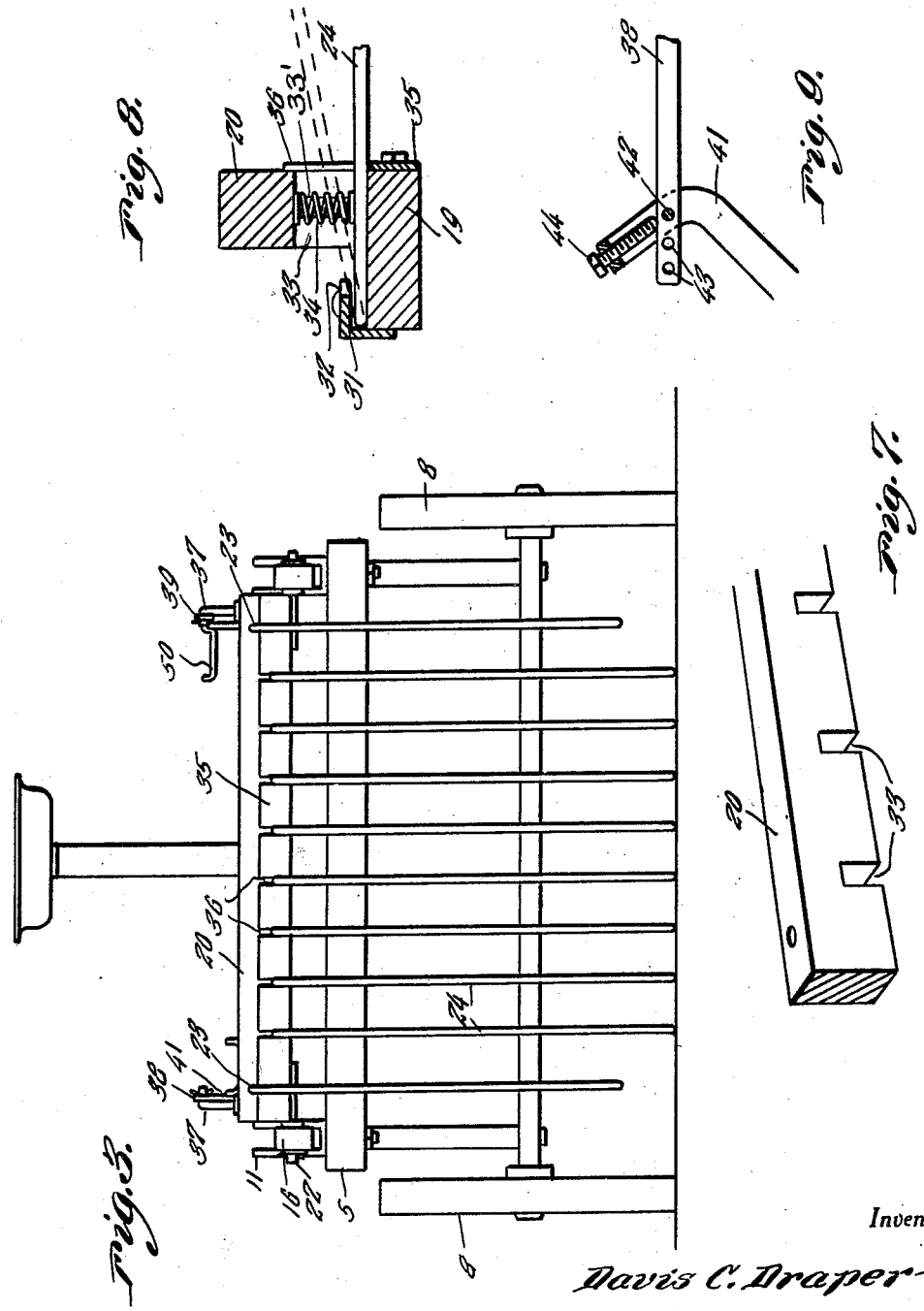

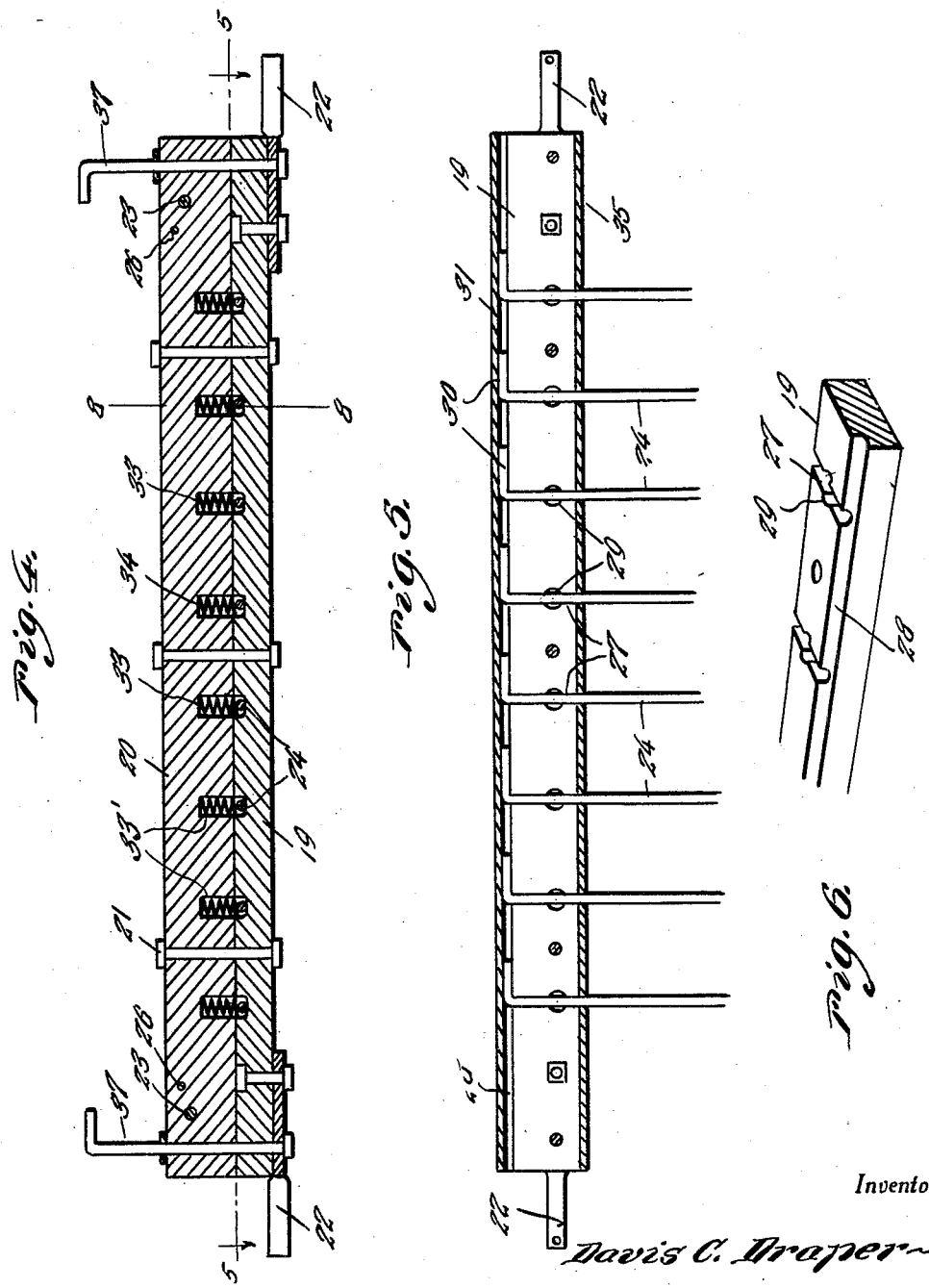

Patented Jan. 19, 1932

1,841,467

UNITED STATES PATENT OFFICE

DAVIS C. DRAPER, OF LINCOLN, DELAWARE

BEAN PILING APPARATUS

Application filed December 17, 1930. Serial No. 503,085.

The present invention relates to a bean piling apparatus particularly designed for use in connection with a bean harvester or bean puller and the purpose is to pile the beans as they are pulled in one operation thereby saving the time, trouble and expense of piling them by hand or with forks in a separate operation.

An important object of the invention resides in the provision of an apparatus of this nature which is exceedingly simple in its construction, comparatively inexpensive to manufacture, strong and durable, easy to manipulate, and thoroughly efficient and reliable in use and operation.

Another very important object of the invention resides in the provision of novel means for mounting the tines of the fork so as to provide individual yieldability in each tine.

A still further very important object of the invention resides in the provision of novel means for controlling the fork so as to press the same downwardly toward the ground as may be required for efficient operation and for swinging the same up from the ground when desired.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of an apparatus embodying the features of my invention.

Figure 2 is a side elevation thereof.

Figure 3 is a rear elevation thereof.

Figure 4 is a longitudinal sectional view through the head of the rake.

Figure 5 is a similar view taken substantially on the line 5—5 of Figure 4.

Figure 6 is a fragmentary perspective view of the lower bar of the head.

Figure 7 is a fragmentary perspective view of the upper bar of the head.

Figure 8 is a sectional view taken substantially on the line 8—8 of Figure 4.

Figure 9 is a detail section taken substantially on the line 9—9 of Figure 1.

Figure 10 is a fragmentary perspective view showing the manner in which the end tines are fixed to the lower bar of the rake head.

Figure 11 is a perspective view of the upper end of one of the tines, and

Figure 12 is a perspective view of an angle iron for holding the intermediate tines in place.

Referring to the drawings in detail it will be seen that I provide a wheeled frame which in the present exemplification of the invention comprises a pair of spaced parallel coextensive transverse bars 5 supported by brackets 6 rising from axle 7 on the ends of which are journalled wheels 8. A longitudinal brace 9 is disposed between the transverse bars 5. The front traverse bars 5 have rising therefrom a pair of brackets 10 while the rear transverse bar has rising therefrom a pair of brackets 11. The brackets 11 are provided with a series of openings 12 to receive bolts 14. A single opening is provided in each bracket 10 to receive a bolt 15. The bolts 14 and 15 support longitudinal bars 16 and by adjusting the bolts 14 the rear ends of the bars 16 may be raised or lowered as may be desired. The tongue is fixed to the center portions of the bars 5. The bars 16 have their front ends above the front cross bar 5 while their rear ends are a distance to the rear of the rear bar 5.

A rake is rockably mounted between the rear ends of the longitudinal bars 16. The head of this rake includes a lower bar 19 and an upper bar 20. These bars 19 and 20 are bolted together as at 21 in superimposed relationship. On the ends of the bar 19 there are mounted trunnions 22 journalled in the ends of the bars 16. A plurality of curved tines 23 and 24 are connected with the head. There are two of the tines 23 one at each end of the head and a plurality of intermediate tines 24. Each tine 23 extends through the upper bar 20 and has a right angularly extending end portion 25 secured to the bar 9 by a hook bolt 26.

The lower bar 19 is provided with transverse grooves 27 and at its front upper corner with a longitudinal groove 28. The central portions of the grooves 27 are enlarged as at 29. The tines 24 have their upper ends resting in the grooves 27 and their right angularly extending terminals 30 resting in the grooves 28 and held therein by means of an angle iron 31 which is formed with notches 32 one for each tine 24 so as to allow the tine to swing upwardly. The bar 20 is formed with a plurality of pockets 33 in the under surface thereof for receiving springs 34 impinging downwardly against the tines 24 and these pockets are enlarged as at 33' to receive the sides of the springs and the enlargement 29 of the grooves 27 receive the lower ends of the spring. A plate 35 is secured on the lower bar 19 and has notches 36 in the upper edge thereof to receive the tines 24 and guide their movement. Thus each tine 24 may yield individually if it engages an obstacle or the like on the ground when the lower ends of the tines 24 are in engagement with the ground. It will be noted in this connection that the lower ends of the tines 23 terminate upwardly from the lower ends of the tines 24 as is clearly indicated in Figure 3. The yieldability of the tines 24 is illustrated to advantage in Figure 8.

In the ends of the rake head are arms 37. Links 38 and 39 are connected with the upper ends of these arms 37 and extend forwardly. An arcuate bracket 40 is fixed to the left hand bar 16 and has a lever 41 pivotally engaged therewith, the pivot being located below the bars 16. The upper end of this lever 41 has a pin 42 extending through one of a plurality of openings 43 in the forward end of the link rod 38. A set screw 44 is threadedly engaged in the upper end of the lever and functions as an adjustable stop to limit the downward breaking movement of the pin 42.

The lever 41 has lateral foot extension 45. By pressing down on this extension 45 with the foot it will be seen that the lever 41 is swung downwardly and rearwardly thereby pushing the link rod 38 rearwardly to force the lower ends of the tine into engagement with the ground as may be necessary. Now by pressing forwardly and downwardly on the foot lever 50 it will be seen that the rake may be swung up to an out of the way or non-ground engaging position. This lever 50 may be held in forward position by hook 60 attached to frame by bolt 61.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, a wheeled frame, a rake rockably mounted in the wheeled frame, a pair of links connected with the rake for rocking the same, a foot lever pivotally mounted on the frame and pivotally mounted with one of the links and normally extending in an upwardly and rearwardly inclined position so that when pressed downwardly the link connected therewith will be moved rearwardly for urging the rake down into engagement with the ground, a second lever to an intermediate portion of which is pivoted the other link so that when the second lever is swung forwardly, the rake may be swung up out of engagement with the ground, said rake including a head and a plurality of tines, said head comprising a lower bar and an upper bar, said lower bar having a plurality of transverse grooves and a longitudinal groove at its forward upper corner, the tines extending into the transverse grooves and having right angular ends extending into the longitudinal groove, an angle iron on the lower bar to hold the angular ends of the tines in the longitudinal groove and having notches to allow a limited swinging movement of the tines, said upper bar being superimposed on the lower bar and having notches registering with the transverse grooves, springs in the notches impinging downwardly on the tines, a guide plate on the lower bar at the rear side thereof and having guide notches through which the tines extend.

2. In an apparatus of the class described, a wheeled frame, a rake rockably mounted in the wheeled frame, and including a head and a plurality of tines, said head comprising a lower bar and an upper bar, said lower bar having a plurality of transverse grooves and a longitudinal groove at its forward upper corner, the tines extending into the transverse grooves and having right angular ends extending into the longitudinal groove, an angle iron on the lower bar to hold the angular ends of the tines in said longitudinal grooves and having notches to allow a limited swinging movement of the tines, said upper bar being superimposed on the lower bar and having notches registering with the transverse grooves, springs in the notches impinging downwardly on the tines, a guide plate on the lower bar at the rear side thereof and having guide notches through which the tines extend, and side tines having their ends anchored in the end portions of the upper bar said side tines being of less length than the intermediate tines.

In testimony whereof I affix my signature.

DAVIS C. DRAPER.